(12) United States Patent
Schel

(10) Patent No.: US 8,934,337 B2
(45) Date of Patent: Jan. 13, 2015

(54) METHOD FOR TRANSMITTING REAL-TIME DATA PACKETS IN CONVERGENT NETWORKS

(75) Inventor: Michael Schel, Nuesttal (DE)

(73) Assignee: Deutsche Telekom AG, Bonn (DE)

( * ) Notice: Subject to any disclaimer, the term of this patent is extended or adjusted under 35 U.S.C. 154(b) by 4 days.

(21) Appl. No.: 13/139,311

(22) PCT Filed: Jun. 2, 2010

(86) PCT No.: PCT/EP2010/003340
§ 371 (c)(1),
(2), (4) Date: Aug. 13, 2011

(87) PCT Pub. No.: WO2010/139461
PCT Pub. Date: Dec. 9, 2010

(65) Prior Publication Data
US 2012/0063301 A1    Mar. 15, 2012

(30) Foreign Application Priority Data

Jun. 2, 2009 (DE) .......................... 10 2009 023 485

(51) Int. Cl.
*H04L 12/26* (2006.01)
*H04W 36/26* (2009.01)
*H04W 36/00* (2009.01)
(Continued)

(52) U.S. Cl.
CPC .......... *H04W 36/26* (2013.01); *H04W 36/0011* (2013.01); *H04W 36/14* (2013.01); *H04W 76/041* (2013.01)
USPC ....................................................... 370/225

(58) Field of Classification Search
USPC ............ 370/464, 329, 332, 328, 228; 714/4.1
See application file for complete search history.

(56) References Cited

U.S. PATENT DOCUMENTS 5,590,400 A    12/1996   Loeppoenen
6,163,527 A  * 12/2000   Ester et al. ..................... 370/228
(Continued)

FOREIGN PATENT DOCUMENTS

WO           01/72076 A      9/2001

OTHER PUBLICATIONS

V. Jesus "Mobility with QoS Support . . . " IEEE 1-4244-1521, Jul. 2007.
(Continued)

*Primary Examiner* — Kevin C Harper
*Assistant Examiner* — Derrick V Rose
(74) *Attorney, Agent, or Firm* — Andrew Wilford

(57) ABSTRACT

The invention relates to a method and a system for transmitting data packets between a terminal (1) and a network node (2) of a convergent communication network via a first channel (3) for a user service, wherein a switch to a second channel (5, 6, 7) is made if the transmission quality of the transmission decreases. The transmission is carried out in a continuous data stream, wherein a predetermined number of data packets per time unit is always present. In order to evaluate the transmission quality, the transmitted data are analyzed by an error detection unit (8) for errors and a switching unit (9) in the terminal (1) and/or in the network node (2) checks whether the number of errors at least within a transmission time window exceeds at least one predefined limit value. While maintaining the transmission of the predetermined number of data packets per time unit, the switching unit(s) (9) switch(es) to the second channel (4, 5, 7) when the at least one limit value is exceeded.

21 Claims, 1 Drawing Sheet

(51) Int. Cl.
*H04W 36/14* (2009.01)
*H04W 76/04* (2009.01)

(56) References Cited

U.S. PATENT DOCUMENTS

| | | | | |
|---|---|---|---|---|
| 6,557,112 | B1* | 4/2003 | Shimada | 714/4.1 |
| 7,039,027 | B2* | 5/2006 | Bridgelall | 370/329 |
| 7,768,958 | B1* | 8/2010 | Baker et al. | 370/328 |
| 2002/0085516 | A1* | 7/2002 | Bridgelall | 370/329 |
| 2006/0062243 | A1* | 3/2006 | Dacosta | 370/464 |
| 2007/0237082 | A1* | 10/2007 | Han | 370/235 |
| 2008/0212537 | A1* | 9/2008 | Bukai | 370/332 |
| 2009/0154426 | A1 | 6/2009 | Perraud | |

OTHER PUBLICATIONS

A. Salkintzis "Seamless Continuity of Real-Time Video . . . " IEEE 1536-1284/05, Jun. 2005.

* cited by examiner

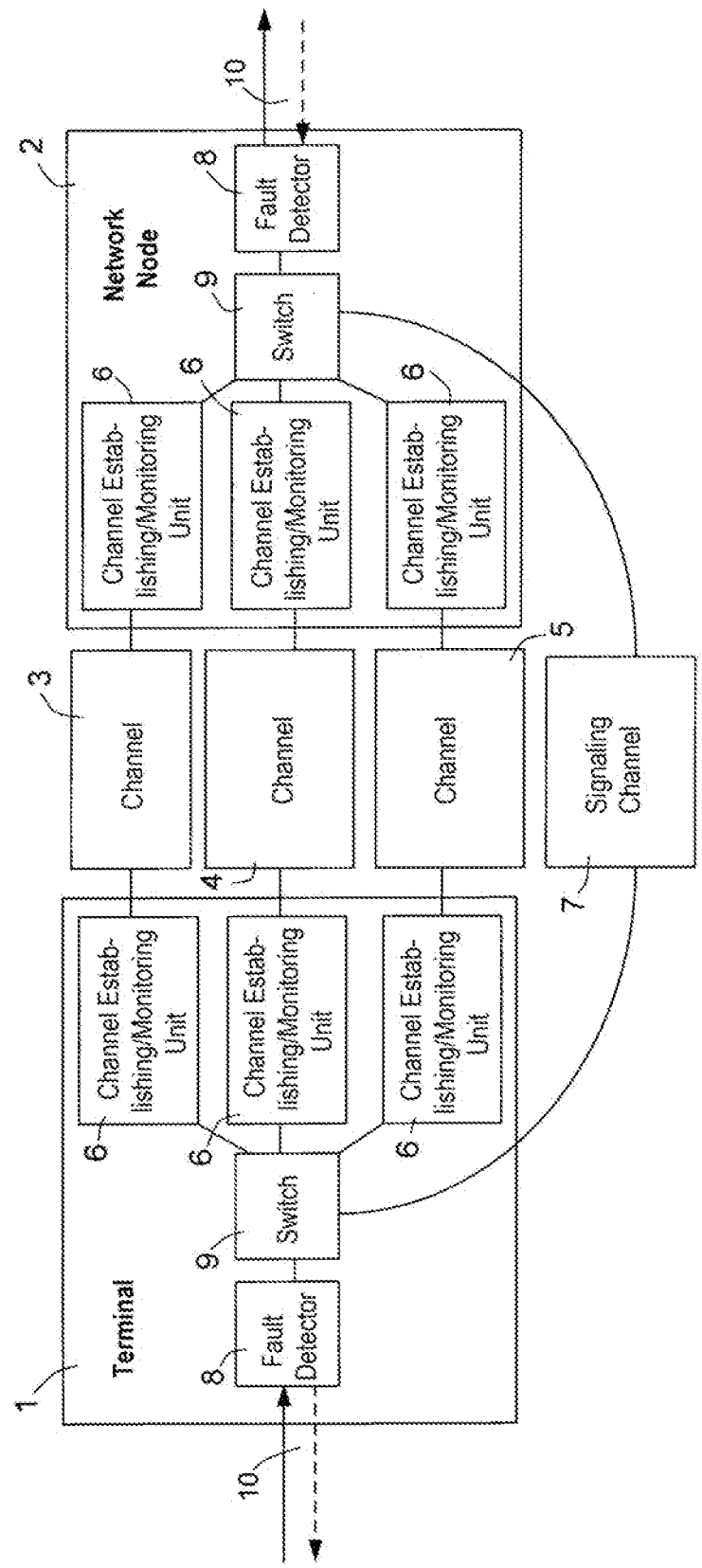

METHOD FOR TRANSMITTING REAL-TIME DATA PACKETS IN CONVERGENT NETWORKS

CROSS REFERENCE TO RELATED APPLICATIONS

This application is the US-national stage of PCT application PCT/EP2010/003340 filed 2 Jun. 2010, published 9, Dec. 2010 as WO2010/139461, and claiming the priority of German patent application 102009023485.3 itself filed 2 Jun. 2009.

FIELD OF THE INVENTION

This invention relates to a method of transmitting data packets between a terminal and a network node of a convergent communications network through a first channel for a user service, where switching to a second channel is effected whenever the transmission quality of the transmission drops. In addition, the invention relates to a system for carrying out the method.

BACKGROUND OF THE INVENTION

In a convergent network, both voice-based and data-based telecommunications applications are combined in one packet-oriented network. They thus provide a shared infrastructure for voice-based and data-based telecommunications applications. The transmission protocol frequently used in these types of networks is advantageously the Internet Protocol (IP). The advantage of these types of networks lies in the enhancement of the IP network along with reduced operating costs and the simultaneous possibility of providing real-time services such as video telephony or life-streaming. Since the transmission of data is effected in IP-networks by packet-based means, the services offered through the network are also termed packet carrier services. These include, in particular, integrated enterprise communication with broadband applications, such as web presentations and video conferencing, where such applications constitute user services. With reference to the ISO-OSI layer model, packet carrier services relate to the processes in and between Layers 1 and 3, whereas user services are located on Layers 4 through 7 and ultimately form the interface between the user and the devices, in particular terminals.

Implementation of a convergent network provides the ability to exploit these packet carrier services from mobile and permanently installed communications terminals. In the following discussion, mobile and permanently installed communications terminals are generally identified as terminals.

Real-time transmission of data is characterized by the transmission of a predetermined quantity of data, i.e. data bits, within a predetermined guaranteed time period in the form of a continuous data stream in a specific sequence, where in each case the same number of data elements are transmitted per time interval within this data stream. For real-time transmission, a subjective requirement must furthermore be taken into account since a user expects to be able to receive and reproduce a file transmitted in real time relatively rapidly and without disruption. The data stream in real-time transmission is thus continuous, and thus generally also designated as streaming. To be sure, a specified timing per data packet (time symmetry) is not absolutely necessary. The timing can instead vary and be selected based on each application. Streaming requires logging in to a resource and also acknowledges the end of the transmission.

A network protocol standard designed by the Internet Engineering Task Force (IETF) is known as Mobile IP and allows the users of mobile devices such as notebooks to switch from a wireless-based computer network through a first transmission medium, such as, for example, WLAN (Wireless Local Area Network), to different computer network, and at the same time enables them to retain a static IP address. The standard is described in Recommendation 3GPP TS 23.234. Mobile IP provides an efficient and scalable mechanism for the mobility of computers. The protocol ensures that mobile computers can switch their access point to the Internet yet still retain their static IP address. This ensures that connections of the Transport Layer remain intact when switching networks. Various mobile providers of Mobile IP employ active cyclic checks and/or radio signal measurements for switching to an alternative transmission medium. Mobile IP is based on carrying out bidirectional communication in order to use other transmission paths. Bidirectional communication requires a certain amount of time that is caused by transmission and data processing in the nodes.

In addition, a telecommunications standard is also known as GAN (Generic Access Network), also called UMA (Unlicensed Mobile Access), that expands voice and data transmission, and the IP Multimedia Subsystem/Session Initiation Protocol (SIP) from mobile telephony to IP access networks such as the Internet. GAN here makes possible the convergence of mobile and wire-based Internet telephony. It enables the user to seamlessly switch between WLAN and WAN (Wide Area Network). A GSM/WiFi-capable (Global System for Mobile Communications, WiFi is a radio standard to use WLAN) dual-mode mobile telephone is required for this purpose. GAN provides an approach where as soon a WLAN is detected a mobile-communications terminal establishes a secure IP connection via a gateway through a tunnel to a server of the mobile-communications network operator, this being identified as a GAN controller (GANC). The server acts like a conventional base station of the cellular mobile-communications network. The mobile-communications terminal communicates through a secure link using special protocols (BSSGP, Base Station System GPRS Protocol). From the point of view of the mobile-communications network, switching by the mobile-communications terminal from the GSM transmission medium to the WLAN transmission medium appears as if the mobile-communications terminal has simply switched the base station, as is the case when changing from one mobile-communications cell to another. The GAN standard uses IETF RTCP (Internet Engineering Task Force, Real Time Protocol Control Protocol) information as the trigger to effect switching in the transmission medium. The standard does not specify any mechanism by which a controlled, needs-based switching to WLAN is effected. Instead switching is always done to the alternative transmission medium if this is available. Since WLAN access points are available in increasing number and density, the use of the GAN standard very often results in switching to the second transmission medium. Apart from this, the approach always monitors whether the mobile-communications terminal is located near a WLAN. This results in increased power consumption and to unnecessary signaling traffic in the network due to the frequent switching.

OBJECT OF THE INVENTION

The object of this invention is therefore to provide a simple, cross-network and universal method that is not limited to mobile-communications telephony or digital broadcasting, and can be employed in any packet-oriented network in which rapid and secure switching of the transmission of data packets is implemented to another channel without detectable disruption for the user as a result of loss of data, this occurring even without the use of bidirectional communication (for example, without acknowledgment of the switch) and only when required.

SUMMARY OF THE INVENTION

This object is achieved by a method characterized in that the transmission is effected in a continuous data stream in which a predetermined number of data packets per unit of time is always present, and the transmitted data are checked for faults by a fault detector in order to assess transmission quality, and a switch in the terminal and/or in the network node checks whether the number of faults exceeds at least one predefined limit value at least within one monitoring time window, the switch(es) switching to the second channel while maintaining the transmission of the predetermined number of data packets per unit of time whenever the limit value is exceeded.

The object is also attained by a system features characterized by a fault detector for checking the data transmission for faults, and respective switches in the terminal and in the network node for checking whether the number of faults at least within one monitoring time window exceeds at least one predefined limit value. Here, the switch(es) is/are set up to is switch to the second channel while maintaining the transmission of a predetermined number of data packets per time unit whenever the limit value is exceeded.

A universal system is proposed for transmitting data packets between a terminal and a network node of a convergent communications network through a first channel for a user service, switching being effected to a second channel whenever the transmission quality drops, the transmission being done as a continuous data stream in which a predetermined number of data packets per unit of time is always present, and the transmitted data are checked for faults by a fault detector in order to assess the transmission quality, and a switch in the terminal and/or in the network node checks whether the number of faults exceeds at least one predefined limit value at least within one monitoring time window, where the switch(es) switch/switches over to the second channel while maintaining the transmission of the predetermined number of data packets per time unit whenever the limit value is exceeded.

The basic idea of this invention consists in continuing immediately the continuous transmission of real-time packet data on a parallel channel in a convergent packet data network by monitoring the data stream (stream) on the receiver side as to whether the real-time requirement no longer complies with the agreed necessary criteria.

The method and system proposed here transmits a defined or definable quantity of data bits within a specified time in a continuous data stream, with a predetermined number of data packets per time unit always present. This is what is meant by real-time transmission. Switching is made as required to another channel as will be described below. The data bits here are transmitted in packets, hereafter also identified as data packets. In contrast to this, other known methods such as Mobile IP transmit a specified volume of data packets within a specified time only when the system is not otherwise affected—for example, by establishing a new connection. If switching from one transmission channel to another transmission channel is required, generally termed a handover, the data transmission loses its real-time property, i.e. one is not ensured that the predetermined number of data bits per time unit arrive at the receiver or arrive fault-free, with the result that the user can detect an audible and/or visible disruption of the user service.

The terminal that can be used according to the invention is, for example, a mobile telephone, mobile-capable notebook, smartphone, digital television, personal computer, or the like. The transmission of the data is effected in packets, and therefore packet-based communications networks, such as the Internet in particular, can be used to transmit the data. In addition to the Internet Protocol (IP), all conceivable data in packet format and frame format can be transmitted according to the invention—for example, Ethernet Frames, ATM (Asynchronous Transfer Mode) cells, or MPLS (Multiprotocol Label Switching) packets. Packet data can also be transmitted in mobile-communications networks and in all other conceivable packet-oriented networks, such as, for example, Ethernet, DSL (Digital Subscriber Line), Digital Video Broadcast Networks, or WLAN.

The network nodes of a convergent communications network constitute the counter-party, i.e. the other side, relative to the terminal. A channel or multiple channels for the transmission of data is/are located between them. In one illustrated embodiment, the network node can be any desired network element within a mobile-communications network and/or a fixed network through which data communication is routed or in which data communication terminates or begins, such as, for example, a router, server, central office, or the like. A channel within the scope of the invention is a transmission link that transmits the data packets defined by the transmission medium, transmission mode, transmission standard, and transmission protocol that is used. Channel switching thus occurs whenever the transmission medium, used transmission mode, used transmission standard, or used transmission protocol is changed. Preferably, the first channel can reside in a first transmission medium while the second channel resides in a second transmission medium.

The term transmission medium within the scope of the invention refers to a medium for transmitting data—for example, air, copper cable or optical fiber, using a transmission mode such as electrical, optical, or electromagnetic transmission in combination with a specified transmission standard, such as, for example, 100 Mbit/s Ethernet, HSUPA (High Speed Uplink Packet Access) as the transmission method of the mobile-communications standard UMTS, or SDSL (Symmetry Digital Subscriber Line) as the transmission method of landline-based data transmission in telephone networks, and a protocol, for example, FTP (File Transfer Protocol), or IP (Internet Protocol). Purely by way of example, the first transmission medium can be air using an electromagnetic mode of transmission through which radio communication is done based on a mobile-communications standard such as, for example, GPRS (General Packet Radio Service). The protocol used can be, for example, the Internet Protocol (IP). However, it is also possible to employ any other transmission medium using a different transmission mode, different transmission standard and protocol that has the capability of transmitting packet data.

Communication between the terminal and the network node can be effected directly. This means that the terminal and network nodes are linked directly to each other through a channel, and no network elements or even complete networks or network components are present between terminal and network nodes through which the data are routed. The packet data can be easily sent in real time through a direct link since the data transmission is not disturbed or affected by other network elements. This is not the case if network elements are present between the terminal and network node. This can result, among other things, in faults and/or delays in the transmission of data. It is thus advantageous for the data transmission to be effected through a tunnel whenever no direct connection exists between the terminal and the network node. The tunnel largely protects the data transmission from disturbances of all kinds that can be created by routing through network elements.

Transmission using GPRS, UMTS (Universal Mobile Telecommunications System), HSPA (High Speed Packet Access), and LTE (Long Time Evolution) is based on a GTP tunnel (GTP, GPRS Tunnel Protocol) that is established between terminal and network node, where transmission is effected in particular through base station, GGSN (GPRS Support Node), and SGSN (Serving GPRS Node). The tunnel can be configured, for example, such that it transmits IP (Internet Protocol) data bidirectionally in unconfirmed fashion, and without repeated transmission in response to a deficient data packet, and with a low bit fault rate (BER) of $10^3$. In addition, the capability also exists for arranging the sequenced packets in the same sequence at the receiver, although this is not important for transmitting data packets in real time.

What is particularly well suited for carrying out the tunnel outside GTP in the method according to the invention is what is known as the ESP-Tunnel (Encapsulating Security Payload) based on what is known as the IPSec (Internet Protocol Security) standard, as specified in memo IETF RFC 4303. Whenever packet data are tunneled from one end to another end, network nodes between these, such as, for example routers, appear transparent. Whenever tunnels are used exclusively, only one IP address per terminal and network node is required according to the invention since all transmission paths have identical end points.

In addition to the described tunnels (GTP, ESP), it is also possible, aside from other tunnel types, to connect network nodes and the terminal directly to each other, with the result that no tunnel is required to transmit data packets. According to the invention, one channel can support one or more tunnels, or also transmit data packets directly. According to the invention, an fault-detection device can check the transmitted data continuously for faults and can communicate the occurrence of these faults to the switch associated with it. Various types of fault can be checked here, such as bit faults, packet faults, and/or faults in the packet sequence, then communicated separately to the switch.

A checksum can be used as the packet sequence by which the correct transmission of the packet data are checkable, for example, through a cyclic redundancy check (CRC). When bit faults are found in the checksum, the receiver determines that the packet has been transmitted incorrectly. The event triggering switching in the transmission medium in this case is a checksum fault.

All of the above-referenced fault types are preferably used to assess the real-time capability of the channel. The switch then checks whether the fault rate, i.e. the number of faults per monitoring time window is being exceeded. To do this, the number of faults is counted in each monitoring time window by the switch. The total fault count for all fault types per monitoring time window can be determined here and compared with a specified limit value.

Alternatively, however, it is also possible to use different monitoring time windows, i.e. monitoring time windows of differing length, for different fault types. This is advantageous specifically also because the transmission of bits through one channel, on the one hand, and the transmission of packets through the channel on the other hand are of differing lengths in terms of time, and in turn the variation in the packet delay time (jitter) can vary essentially between ±5 ms and ±1000 ms depending on the user service, and thus for one a monitoring time window of a given length is also required that differs from the length of a monitoring time window to determine bit faults or packet faults. Provision can therefore be made whereby the switch simultaneously checks whether the bit faults within a first monitoring time window, the packet faults within a second monitoring time window, and the jitter faults within a third monitoring time window, reach a count that exceeds a respective specified limit value, where the first, second, and third monitoring time windows are of different lengths in terms of time. In this embodiment, a separate limit value is thus specified for each fault type, which value must not be exceeded within the monitoring time windows. Otherwise a channel switching is triggered.

In an advantageous development of the invention, a simultaneous check is made within two, preferably within three or more, monitoring time windows of different time length as to whether the number of faults exceeds specified limit values. This can be done for the situation in which a total fault count of all fault types is checked as to whether it exceeds a specified limit value. Alternatively or cumulatively, this can be done for the situation in which each fault type is checked separately. For this situation, that means that two, three, or more respective monitoring time windows are used. A relatively short, medium, and long monitoring time window is preferably used for each fault type such that for three fault types a total of nine monitoring time windows are monitored simultaneously as to whether a number of faults occurs in them that in each case exceeds a predetermined limit value. This enables a comprehensive fault pattern to be generated that allows for a reliable assessment of the transmission quality. Switching to the second channel is done only if two or more limit values are exceeded simultaneously within the monitoring time windows. There is thus no problem, for example, if only one or two faults occur in respective multiple relatively short time windows since these can be corrected by known fault-correction devices. If, however, the sum of these uncritical faults in the small time window is higher than a limit value in a longer, for example, a minute time window, this indicates a degraded or degrading transmission quality and the channel should be changed to prevent a noticeable impairment of the user service.

The length of the monitoring time window(s) can be stored in a dataset associated with the user service or be computable from this dataset, which the switch of the terminal and/or of the network node loads before beginning the data transmission and uses to determine the length of the monitoring time window(s).

In an advantageous development of the invention, the length of the monitoring time window(s) can be selected as a function of the volume of data to be transmitted. This is significant since the volume of data to be transmitted determines the transmission time of the total transmission, and at least a relatively long monitoring time window should not last longer than the total transmission. To this end, values can be contained in the form of a list as to which time window length or time window lengths should be preferred for the individual fault types in the event of a given volume of data.

In an especially preferred approach, the length of the monitoring time window, or of one of multiple monitoring time windows, is selected in terms of its length so that at most one fault, or with respect to the individual fault types at most one bit fault, one packet fault, one jitter fault, or one sequence fault, may occur within the window. This represents, on the one hand, the shortest technically useful length of a monitoring time window to be able to detect an fault since no half bit faults or packet faults are detected, and, on the other hand, ensures an effective quality control of the transmission quality, since when given excessively long intervals a correspondingly greater number of faults can occur for which the excessively high count is detected in the time window only once the real-time transmission has been noticeably degraded for the user.

The predefined length of the time interval should furthermore be preferably selected as a function of the channel used for the data transmission. The length can thus be defined larger relative to the degree the data transfer rate to be maintained and ensured becomes smaller. For example, for connections having a data transfer rate below 100 Mbit/s, [ . . . ] can have a length of at least 100 milliseconds. These values can vary significantly, however, as a function of the parameters of the channel. Given an example of transmission through optical fiber as the first channel having a bandwidth of 10 Gbit/s, and a second optical fiber with a bandwidth of 10 Gbit/s as the second channel, time intervals according to the invention of a few or multiple microseconds or less can be used as the criterion for switching. This criterion ensures that no switching in the transmission medium is made when only small, brief losses, which are unnoticeable in terms of the usability quality, are present in the transmission quality, so that the load on the network is not unnecessarily increased by additional signaling, and power resources are not unnecessarily drained in the terminal.

In an advantageous development of the invention, the limit value(s) can be stored in a dataset associated with the user service, or can be computable from this dataset that the switch of the terminal and/or of the network node loads before beginning the data transmission and employs to determine the limit value(s). In addition, a complete dataset can be used where the monitoring interval lengths and the limit values are stored together. Provision is furthermore made according to the invention whereby the limit values are selected in more stringent form than is demanded by the requirements for the user service. This ensures that any degradation of the user service is prevented with a very high degree of certainty.

In another advantageous development of the method according to the invention, the switch of the network node determines the length of the monitoring time window(s), and of the limit value(s), then communicates this to the terminal. This has the advantage of not adversely affecting the terminal's power resources, storage resources, or also the computing resources if it is necessary to compute limit values or monitor window lengths.

If it is determined according to the invention that a specified maximum fault count has not been or is not being complied with in one or more monitoring time windows, a trigger signal (trigger, signaling) can be issued that initiates channel switching. The trigger signal thus causes the connection through the first channel to be released and then established through a second channel where data transmission is continued. The switch of the terminal and/or of the network node sends a trigger signal to the switch of the other side whenever at least one limit value, preferably multiple limit values, are being exceeded, whereupon the switch of the other side switches over to the second channel.

The trigger signal can be sent through a signaling channel. This type of signaling channel is typically found between the terminal and the network node, and does not have to be established separately. The signaling channel has a lower data transfer rate than the first channel. This enables resources of the network node or of the network to be saved, and power consumption by the terminal to be reduced. The signaling channel connects the switches of network nodes and terminal to each other. Alternatively, provision can be made whereby whenever the terminal and the network nodes are interconnected through multiple channels the trigger signal is sent through more than one of these channels, in particular, through all of the channels. This ensures that the trigger signal arrives at the other side.

An SMS can be used as the trigger signal. This can be sent in at least one data packet to the network node, in response to which the network node changes the channel. The data packet here can contain information indicating which channel to switch to. In this case, no bidirectional communication is necessary to initiate a channel switching.

Three preferred embodiments can be used for switching to the second channel. In a first variant, the second channel is established between the terminal and the network node essentially simultaneously with the first channel. The second channel has thus already been established before a trigger signal, and can be used immediately in the event of a trigger signal to take over the transmission of data. The second channel is thus maintained in parallel to the first channel in this variant. As a result, switching to the second channel can be implemented without delay and without loss of data packets, i.e. in real time.

In a second variant, the signaling channel can be upgraded at least temporarily at least to the data transfer rate of the first channel and used as the second channel. In the case of ISDN in Germany, for example, the signaling channel can be used for smaller data transmissions having a data transfer rate of 9600 bit/s. This is also possible with GPRS. In this way the signaling channel can become the second channel that takes over the transmission of the data packets in real time for the duration of the total transmission.

In a third variant that further develops the second variant, an additional channel is established between the terminal and the network node, and the data transmission is then switched over from the signaling channel to the additional channel. This enables the signaling channel to be "relieved," i.e. used only temporarily. The signaling channel makes available the data bandwidth of the first channel until the second channel is available as a replacement. As a result, the signaling channel can be used as a bridge between the first and second channels since the data transmission in real time is effected in the signaling channel only briefly, i.e. for a few milliseconds to several seconds. The data transmission is preferably routed from the signaling channel to the additional channel within a few milliseconds or a few microseconds.

The terminal and the network node can be connected to each other through two or more channels, where the data transfer rate of each channel is monitored by the switch of the terminal and/or of the network node. According to the invention, that channel is used as the second channel that at that time has the highest data transfer rate.

Switching to the second channel can preferably be done whenever the current data transfer rate of the second channel is greater than the data transfer rate of the first channel, and the second channel has not been used within the last few seconds. This ensures that no switching is done to a channel that has already been used immediately previously but which nevertheless was changed due to poor transmission quality. This prevents any jumping back and forth in quick succession between two channels.

According to the invention, channel-establishing and monitoring units are provided in the network node that communicate the type and/or the transmission standard of the available channels, in particular, together with their respective currently available data transfer rates, to the respective switch of the terminal or of the network node.

It is furthermore especially advantageous if the data packets contain header data that is transmitted in compressed form. What is termed robust header compression, as specified in the memo IETF RFC 3095, provides the advantages that the probability of faulty data packets is lower since fewer data bits are transmitted within a data packet. Since as a result less data is also transmitted per channel user, more users can use the channel. Robust header compression only functions, however, if the two end-of-messages can communicate directly without additional traffic nodes between them. This is ensured by the use of a tunnel for the transmission of the data or through a direct connection.

The invention furthermore proposes a system for carrying out the method, comprising a terminal, a network node of a convergent communications network, and a first channel through which the terminal is connected to the network node to transmit data packets in a continuous data stream in which a predetermined number of data packets per time unit is always present, furthermore comprising at least one second channel to which the data transmission can be switched when the transmission quality drops, wherein a fault detector is provided for checking the data transmission for faults, and a switch is provided in the terminal and in the network node for checking whether the number of faults within at least one monitoring time window exceeds at least one predefined limit value, wherein furthermore the switch(s) is/are set up to switch to the second channel while maintaining the transmission of a predetermined number of data packets per time unit.

The fault detector can be a header compression device that is provided between a switch and a data interface.

A channel-establishing and monitoring unit is associated with each of the channels in the terminal and the network node, and the corresponding switch can be connected upstream of the channel-establishing and monitoring units of the same side in the data transmission direction of the channel.

The switches of terminal and network node can furthermore be connected or connectable to each other through a signaling channel.

BRIEF DESCRIPTION OF THE DRAWING

The following discussion describes the invention in more detail based on a preferred embodiment and the attached single drawing FIGURE.

DETAILED DESCRIPTION OF THE INVENTION

The FIGURE is a schematic diagram of a terminal 1 in the form of the logic unit, and a network node 2 also in the form of a logic unit, which are connected through a first channel 3 and through additional optional channels 4, 5. The channels 3, 4, 5 each represent a data link that can be provided directly between the terminal 1 and the network node 2—i.e. no additional network element is located between network node and terminal through which the data transmission is effected. Alternatively, the channels 3, 4, and 5 can each represent a network through which the data transmission is routed. In this case, one IPSec (ESP, Encapsulated Security Payload), GTP, or other tunnel each for the data transmission is provided in the channels. In another alternative, one or two of the channels 3, 4, and 5 can represent a direct connection, whereas a tunnel is provided in the other channel(s) 3, 4, 5. Channel-establishing and monitoring units 6 are provided in each case in the terminal 1 and the network node 2 to set up the corresponding tunnel or direct connection.

A switch 9 according to the invention in the terminal 1 and the network node 2 for changing the channel is connected to the corresponding channel-establishing and monitoring units 6 of the terminal 1 or of the network node 2. The channel-establishing and monitoring units 9 decide through which of the channels 3, 4, 5 the data transmission should be effected and feed the data packets to be transmitted to one of the channels 3, 4, and 5. In addition, the switches 9 of the terminal 1 and the network node 2 are connected to each other through a signaling channel 7 through which a trigger signal can be sent. A header compression device 8 to effect fault detection and compression of the headers of the packet data to be transmitted in the terminal 1 and the network node 2 is also linked to the corresponding switch 9. Header compression can also be advantageously effected according to memo IETF RFC 3095.

The switches 9 come into operation between the first channel 3 and header compression devices 8 in the terminal 1 and the network node 2. Since the switch 9 in the network node 2 and in the terminal 1 has connections to all the channels 3, 4, 5, and preferably also to the signaling channel 7 while on the other hand the robust header compression 8 can control only one channel, all of the components, i.e. the channel-establishing and monitoring units 6, the switches 9, and the header compression devices 8 are accommodated on the logical level, i.e. both in the system unit of the terminal 1 and in the system unit of the network node 2.

Since all data packets from user services run through the switch 9 according to the invention in the terminal 1 and in the network node 2, a unique source address, for example, a "Source IP Address," can be assigned to each data stream, with the result that additional functions of the Mobile IP, such as those typical with other methods, are no longer required. Establishing and ending a so-called "home agent" of the Mobile IP is not required since the system and/or method according to the invention has a connection to the network node as long as a channel is available. A home agent as defined for Mobile IP is a unit that assigns to the terminal an IP address in a tunneled connection even when the terminal is connected to a network node of a visited network, i.e. of a base station of a third-party network.

The trigger according to the invention for the transmission medium is effected based on direct acquisition, in particular, measurement of at least one technical parameter that is not based on the protocol information of the IETF RTCP functions. Data that are transmitted from the first channel 3 to header compression device 8 are checked there and compared with the limit values for the fault types per monitoring time window. The following parameters are used to do this for each existing channel:

In response to a real-time transmission request, the user service communicates to the switch 9 of opposite logic unit 1, 2 the following data implicitly through the transmission itself and/or explicitly in a separate transmission (signaling packet) as the specified limit values:
number of data packets to be transmitted in real time within at least three different monitoring time windows, with the respectively allowed fault count per monitoring time windows (data volume/variation/time of a stream including start and end)
allowed number of missing or faulty data packets to be transmitted and bit faults for the specific user service (data faults per time period)
type of user service: conversational, broadcast, offline streaming, (general quality criterion, necessity of unique sequencing, size of the data packets (bits per packet)

allowed jitter for arrival of packets (packet delay variation) measured within at least three different time intervals;

Optionally, the user service also communicates whether the data packets are of the same size (number of bits) or whether these must be appropriately repackaged. If the user service cannot supply these and the above-mentioned parameters, limit values and monitoring window lengths are used from a dataset that has been stored there.

Header compression device 8 continuously communicates the following data to the switch 9 within logic unit 1, 2:
  the sequence number of the packets that should arrive from which it can be deduced that or if packets are missing
  bit faults and/or packet faults of the last data packets
  jitter faults (packet delay variation) of the last data packets Before the transmission and ideally during the transmission of a given data stream, channel-establishing and monitoring unit 6, and preferably also the channel 7, communicate the following data to the switch 9 of unit 1, 2:
  the type of available channels including information about access technology, preferably including typical parameter values of the access technology such as fault rate, packet delay variation, possibility of unique sequencing, and
  the available bandwidth, preferably for a given user service, preferably with indication of the allowed holding time.

The switch 9 generates a trigger to switch to the other channel 4, 5 based on the known, previously mentioned information whenever
  the user service can be routed to the other transmission medium 4, 5 based on the information of channel 4, 5, and channel 4, 5 has not been used in the most recent seconds, and
  a channel, such as, for example, WLAN or Ethernet, is available that is more cost-effective or is less burdened by traffic from other terminals, or
  the number of packets per second, for at least 3 different time intervals of predetermined length, in particular, longer than 100 ms, is lower than the allowed number within the tolerance, or
  the jitter (packet delay variation) for at least 3 different time intervals of predetermined length, in particular, longer than 100 ms, is above the specified tolerance value, or
  the sequence number is outside the tolerance, i.e. the data packets are no longer arriving in the correct sequences or the stream is no longer continuous, or
  the bit fault rate for at least three different time intervals is worse than the specified tolerance value of multiple packets.

The limit values to be complied with by the fault rates in the monitoring time windows—noncompliance trigger switching—must be stricter than the specified requirements of the user service, since otherwise the switching only occurs if the real-time criterion can no longer be met and the user of the user service is already able to perceive a degradation of the user service. The specified requirements of the user service to be met, also called user service parameters, are generally known as Quality of Service parameters.

If a trigger has been generated, the switch 9 on the receiver side, which can be the network node 2 or the terminal 1, sends at least one message packet through all the available channels 3, 4, and 5, 7 to the transmitter, which accordingly can be the terminal 1 or the network node 2, which immediately uses a different channel 4 or 5 for the transmission. The switch 9 relays the data coming from new channel 4 or 5 to the header compression device 8 of the receiver.

In order to prevent all of the transmission paths from being reserved permanently for a possible transfer, in particular, in order to save power and transmission capacity, the following advantageous functions and/or methods can be used depending on the application, i.e. on the user service using the packet data transmission:

Conversational Data (i.e. Streaming of Voice and/or Image Data, for Example, in a Bidirectional Video Telephony Link):

A first channel 3 is used by the switch 9 of the terminal 1. Another parallel channel 4 or 5 is maintained permanently by the switch of the terminal 1.

It is only possible to speak in terms of loss of quality if faults occur in the transmission at the user service level. Packets that have been sent and have arrived defective can be corrected in part by the FEC. The critical threshold where faults have only a low probability of being corrected should always be used to initiate a switching operation (trigger).

As a precaution, packets are transmitted during the switching phase over multiple channels since the network node 2 and the terminal 1 are not synchronized in terms of time.

In an advantageous development of the invention, the faulty packets can be sent once again in the event that many faults occur, i.e. faulty packets are found and a unique sequence of packets is not required. In addition, a sequencing device having a cache on the receiver side, i.e. in the terminal 1 or in the network node 2, can then be provided in which the retransmitted packets are cached, the sequencing device then reordering the data packets from the cache.

Broadcast:

The first channel 3 is used by the switch 9 or the network node 2, where an additional direct signaling channel 7 at lower data bandwidth is used for signaling and for smaller data volumes, this channel being replaced within a few seconds by a requisite broader-band channel 4 or 5 in which the user data, i.e. the packets, can be transmitted after switching. The advantage here is that the radio resource is utilized more economically, while on the other side, i.e. at the terminal 1, power consumption can be reduced. The transfer can nevertheless proceed rapidly since alternative transmission channel 7 is already available which then only has to be adjusted to match the resource parameters or be replaced by channel 4 or 5. For the transfer period that is required to search and provide an appropriate channel 4, 5, or to adjust the resource parameters, the data in the channel 7 can be transmitted so as to comply with the real-time requirements.

The channel 7 can be designed so as to be able to transmit large volumes of packets for a brief period, thereby enabling it to be employed as a reserve channel for unforeseen capacity demands in response to any disruption of a used channel 3, 4, or 5. Signaling should be understood to refer to streaming an individual packet.

Offline Streaming (for Example, During a Download of a Stored Voice Message from a Service (Voicemail) Download):

The first channel 3 is used by the switch 9 of the terminal 1. The additional channel 7, whose function is exclusively signaling, for example for an electronic short message (SMS), can be used to implement media switching. This mode of operation saves the most transmission resources and battery since an additional channel 4 or 5 is only established if the original channel 3 may possibly not be available. This method is also suitable for transmitting, i.e. streaming, data such as, for example e-mails in real time that can then be transmitted rapidly in one piece as soon as, for example faster transmission resources (for example WLAN data docking station) are available. The trigger can then be initiated by an external event.

Whenever no real-time data are being transmitted, the switch 9 stays in idle or power-saving mode. The switch 9 is started in response to a data transmission by the respective header compression device 8.

The following discussion describes the functional process of the invention based on the example of an FTP data transfer (File Transfer Protocol) in real time:

At his terminal 1, a user uses a program to transmit a file from an FTP server representing the network node 2. The program is thus a user service that enables the user to effect a data transfer by FTP. The program opens a connection in the channel 3 to the FTP server, i.e. from the terminal 1 to the network node 2. This connection is used for signaling and is thus not yet used to transmit user data in real time. The data sent through the channel 3 are transmitted through the switch 9 of the terminal 1 and the switch 9 of the network node 2 (FIG. 1), which are located respectively between the program or the file stored on the network node 2 and channel 3, by establishing the connection such that the switch 9 can monitor these data in order to detect possible impending real-time transmissions.

The user selects a file file.doc on the server 2, for example, through the command GET, for example GET "file.doc." The command represents a signaling message that is transmitted through the channel 3 to the server 2. The server 2 reacts to this message by returning at least one additional signaling message. The signaling messages can be evaluated by the switch 9. Based on the signaling information contained in them, the switches 9 detect the user service being used, in particular, the FTP protocol to be used for the data transfer. Based on the signaling traffic, thE switches 9 simultaneously detect the file size of file "file.doc" to be transmitted to the terminal 1. The file size is the deciding factor as to how long the data transmission will last and how long the monitoring time window(s) should be.

The switch 9 of the server and of the terminal 1 then loads a dataset associated with the user service, and the dataset is stored in the server 2. Defined in the dataset are transmission parameters for the user service and limit values for the number of bit faults, the number of packet faults, and the number of jitter faults that may occur in at least one monitoring time window, which is also defined in the dataset. Two or three monitoring time windows per fault type are preferably stored in which the fault count for the parameters bit faults, packet faults, and jitter faults must not exceed a defined limit value. For example, the monitoring time window for bit faults given a file size of 8 megabytes can be 12.5 milliseconds, where a maximum of one bit as the limit value fault may occur in this time window.

In terms of the transmission parameter for the user service, at a minimum the gross data transfer rate per time unit stored in the dataset is, for example, 8 Mbit/s. Additional transmission parameters can also be included in the dataset. From the file size, the switch 9 uses the transmission parameter(s) to compute the amount of time the transmission needed to transmit the file from the server 2 to the terminal 1 in real time, i.e. in a continuous data stream with a fixed number of bits per time unit.

The channel-establishing units 6 of the server 2 communicate to the switch 9 of the server 2 which transmission media are available, i.e. that transmission mode, and how much capacity is still available in the respective channels establishable or established by them. In the case of radio transmission, the capacity can be determined by assessing the RF field signal strength.

According to the invention, the channel 3 transmission is the one that provides the highest data transfer rate (bandwidth) and has sufficient capacity for the user service. This is decided by the switch 9 of the server 9 [2] based on the data supplied by the channel-establishing and monitoring units 6 of the server 2. Whenever the channel 3 selected for the data transmission has a lower data transfer rate than is associated with the user service, the time duration for the transmission is adjusted accordingly.

The channel-establishing and monitoring units 6 of the selected channel 3 are instructed by the switch 9 to establish the channel 3 and signal the establishment to the channel-establishing and monitoring units 6 of the terminal 1. The establishment of channel 1 [3] is then effected between the two channel-establishing and monitoring units 6 of the terminal 1 and of the server 2, and the data transmission begins in real time.

The data transmission is effected both by the server 2 and also by the terminal 1 through the fault detector 8 provided between the respective switch 9, and a data input 10 or a data output 10. The input 10 in FIG. 1 schematically represents an interface to the storage location of the file to be transmitted "file.doc." Data output 10 corresponds to an interface to the program that makes the file available to the user, for example, by reproducing it graphically and/or acoustically.

The fault detector 8 of the terminal 1 continuously determines the bit faults, packet faults, jitter faults, and preferably sequence faults in the received data, and communicates the faults to the switch 8 [9] in the terminal 1. This is only possible because the transmission is being effected in real time, i.e. the data stream is continuous with a fixed number of bits per time unit.

The switch 9 now checks whether the number of bit faults, packet faults, or jitter faults in the monitoring time window(s) exceeds the limit values defined in the dataset. To this end, the switch 9 can have confidence in the fact that the same number of bits per time unit are always being received for the duration of the transmission. The number of bit faults, packet faults, or jitter faults per monitoring time window is counted and compared with the limit values. Also preferably checked is whether one sequence fault per monitoring time window is present.

As soon as the fault count exceeds one or more limit values, the switch 9 of the terminal 1 sends a signal through all the available channels 3, 4, and 5 to the switch 9 of the server 2, which then immediately relays the FTP transfer through the existing signaling channel 7. The switch 9 in the terminal 1 then promptly relays the data arriving on the signaling channel 7 to the fault detector 9 in the terminal 1.

Based on the information supplied by the channel-establishing and monitoring units 6 through the available channels 4 and 5, and their transmission properties such as data transfer rates, the switch 9 simultaneously checks and decides which channel 4 or 5 can and should be used as an alternative to channel 3. Subsequently, the switch 9 notifies the respective channel-establishing and monitoring unit 6 of the second channel 4 to establish the second channel 4. This channel-establishing and monitoring unit 6 signals the establishment of the second channel 4 to the channel-establishing and monitoring unit 6 of the terminal 1, and the second channel 4 is established. As soon as the second channel 4 is established, the switch 9 of the server 2 switches to the second channel 4, and the FTP transfer is continued in the second channel 4 and thus no longer in the signaling channel 7. As soon as the data arrive in the terminal 1, the switch 6 of the terminal also switches to the second channel 4 and feeds the data to the fault detector 8. As soon as the FTP transfer is terminated, no switching is made to the first channel 3. Instead the second channel 4 becomes the first channel 3 for future real-time transmissions.

The invention claimed is:

1. A method of transmitting data packets between a mobile terminal and a network node of a convergent communications network through a first channel residing in a first transmission medium using a first transmission technology and a second channel residing in a second transmission medium using a second transmission technology for a user service, the first and second transmission technologies differing in transmission mode, transmission standard, or transmission protocol, the method comprising the steps of:
   establishing the first channel between the mobile terminal and the network node,
   establishing the second channel between the mobile terminal and the network,
   transmitting the data via the first channel in a continuous data stream in which a predetermined number of data packets per unit of time is always present,
   checking the transmitted data for different fault types by a fault detector within monitoring time windows of different time lengths each for a respective one of the different fault types in order to assess transmission quality,
   simultaneously checking with a switch in the mobile terminal or in the network node whether the number of faults in each of the monitoring time windows exceeds a total fault limit value of all fault types and whether the number of faults of each fault type in the respective monitoring time window separately exceeds a respective predefined limit value, and
   when the fault number exceeds the total fault limit value or when two or more limit values are exceeded simultaneously in the monitoring time windows, the switch, while maintaining the transmission of the predetermined number of data packets per unit of time whenever the limit value is exceeded moves the data transmission to the second channel.

2. The method according to claim 1, wherein the fault detector continuously checks the transmitted data for bit faults, packet faults, jitter faults, or faults in the packet sequence, and communicates the occurrence of these faults to the respective switch.

3. The method according to claim 1, wherein the time lengths of the monitoring time windows are stored in a dataset associated with the user service or are computed from this dataset that the switch of the mobile terminal or the network node uses to determine the length of the monitoring time window before beginning a data transmission.

4. The method according to claim 1, wherein the time lengths of the monitoring time windows are selected as a function of the volume of data to be transmitted.

5. The method according to claim 1, wherein the limit value or values are stored in a dataset associated with the user service or are computed from this dataset that the switch of the mobile terminal or of the network node uses to determine the limit value before beginning transmission of the data.

6. The method according to claim 1, wherein the switch of the mobile terminal or of the network node sends a trigger signal to a switch of the respective other side whenever the limit value or values is exceeded, whereupon the switch of the other side switches over to the second channel.

7. The method according to claim 6, wherein the trigger signal is sent through the signaling channel.

8. The method according to claim 6, wherein the mobile terminal and the network node are connected to each other through multiple channels, and the trigger signal is sent through more than one of these channels or through all of the channels.

9. The method according to claim 1, further comprising the steps of:
   before establishing the second channel, establishing a signaling channel between the mobile terminal and the network;
   when the fault number exceeds the total fault limit value or when two or more limit values are exceeded simultaneously in the monitoring time windows, the switch, while maintaining the transmission of the predetermined number of data packets per unit of time whenever the limit value is exceeded, moves the data transmission to the signaling channel while upgrading the signaling channel temporarily at least to the data transfer rate of the first channel;
   establishing the second channel between the mobile terminal and the network node and
   thereafter switching data transmission from the signaling channel to the second channel.

10. The method according to claim 9, further comprising the step of:
    routing the data transmission within at least a few milliseconds or a few microseconds from the signaling channel to the second channel.

11. The method according to claim 6, wherein the trigger signal is an electronic short message.

12. The method according to claim 1, further comprising the steps of:
    connecting the mobile terminal and the network node to each other through two or more channels,
    monitoring the data transmission of each channel by the respective switch of the mobile terminal or of the network node, and
    using one of the channels as the second channel that currently has the highest data transfer rate.

13. The method according to claim 1, wherein switching to the second channel is effected whenever the current effective data transfer rate of the second channel is greater than the data transfer rate of the first channel and the second channel has not been used within the last few seconds.

14. The method according to claim 1, wherein the data transmission is effected through a tunnel whenever no direct connection exists between the mobile terminal and the network node.

15. The method according to claim 1, further comprising the step of:
    communicating via channel-establishing and monitoring units in the mobile terminal or in the network node of the respective switch of the mobile terminal, or of the network node the type or the transmission standard of the available channels together with their respective currently available data transfer rates.

16. The method according to claim 1, wherein only the switch of the network node determines the length of the monitoring time window and of the limit value, and communicates this to the mobile terminal.

17. The method according to claim 1, wherein the limit values are more stringent than demanded by the requirements for the user service.

18. A system comprising:
    a mobile terminal,
    a network node of a convergent communications network, means for establishing and maintaining between the mobile terminal and the network node a first channel that resides in a first transmission medium using a first transmission medium using a first transmission technology and through which the mobile terminal is connected to the network node to transmit data packets in a continuous data stream in which a predetermined number of data packets per time unit is always present, means for establishing between the mobile terminal and the network node at least one second channel that resides in a second transmission medium using a second transmission technology and to which the data transmission can be switched whenever the transmission quality drops, the first and second transmission technologies differing in transmission mode, transmission standard, or transmission protocol, a fault detector for checking the data transmission for different faults within at least two monitoring time windows of different time lengths for respective different fault types in order to assess transmission quality, and a respective switch in the mobile terminal and in the network node for simultaneously checking in each of the monitoring time windows whether the number of faults exceeds a total fault limit value of all fault types and whether the number of faults of each fault type in a monitoring time window separately exceeds a predefined limit value, and for switching to the second channel while maintaining the transmission of a predetermined number of data packets per time unit when the fault number exceeds the total fault limit value or when two or more limit values are exceeded simultaneously in the respective monitoring time windows.

19. The system according to claim 18 wherein the fault detector is a header compression device that is provided between a switch and a data interface.

20. The system according to claim 18, further comprising:

a respective channel-establishing and monitoring unit for each of the channels in the mobile terminal and in the network node, the corresponding switch being connected upstream of the channel-establishing and monitoring units of the same side in the data transmission direction of the channel.

21. The system according to claim 18, wherein the switches of the mobile terminal and of the network node are connected or connectable to each other through a signaling channel.

* * * * *